United States Patent [19]

Trotoir

[11] Patent Number: 5,516,814
[45] Date of Patent: May 14, 1996

[54] PROCESS FOR PREPARING A POLYMER CONCENTRATE

[75] Inventor: Jean-Paul Trotoir, Waret-La-Chaussee, Belgium

[73] Assignee: Imperial Chemical Industries PLC, London, England

[21] Appl. No.: 322,406

[22] Filed: Oct. 12, 1994

Related U.S. Application Data

[63] Continuation of Ser. No. 863,371, Apr. 3, 1992, abandoned, which is a continuation of Ser. No. 745,766, Aug. 16, 1991, abandoned, which is a division of Ser. No. 361,721, Jun. 5, 1989, Pat. No. 5,053,444, which is a continuation of Ser. No. 82,577, Aug. 7, 1987, abandoned.

[30] Foreign Application Priority Data

Sep. 1, 1986 [GB] United Kingdom ............. 8621094

[51] Int. Cl.$^6$ ..................................... C08J 3/22
[52] U.S. Cl. .................. 523/122; 523/210; 523/322; 523/351
[58] Field of Search .................. 523/122, 210, 523/322, 333, 351

[56] References Cited

U.S. PATENT DOCUMENTS

| | | | |
|---|---|---|---|
| 3,030,330 | 4/1962 | Cines et al. | 523/351 |
| 3,178,390 | 4/1965 | Reed et al. | 523/351 |
| 3,686,113 | 1/1967 | Burke, Jr. | 523/351 |
| 3,755,244 | 8/1973 | Hart | 523/351 |
| 3,830,765 | 8/1974 | Fejer | 523/351 |
| 3,932,323 | 1/1976 | Perry | 523/351 |
| 3,975,326 | 8/1976 | de Vrieze | 523/351 |
| 3,976,612 | 8/1976 | Kaji et al. | 524/318 |
| 4,004,940 | 1/1977 | Cormier | 523/351 |
| 4,025,690 | 5/1977 | Nanni | 523/351 |
| 4,041,002 | 8/1977 | Abashi et al. | 524/318 |
| 4,069,288 | 1/1978 | Barkhuff, Jr. et al. | 523/351 |
| 4,151,132 | 4/1979 | Khanna | 524/114 |
| 4,197,221 | 4/1980 | Eisenmenger et al. | 523/351 |
| 4,238,384 | 12/1980 | Blumberg et al. | 523/351 |
| 4,268,432 | 5/1981 | Maslen et al. | 523/351 |
| 4,369,267 | 1/1983 | Keung et al. | 523/351 |
| 4,369,272 | 1/1983 | Jaffe | 523/351 |
| 4,407,987 | 10/1983 | Crocker et al. | 523/322 |
| 4,415,691 | 11/1983 | Allen et al. | 524/114 |
| 4,464,487 | 8/1984 | Thomas et al. | 523/351 |
| 4,471,080 | 9/1984 | Rinaldi et al. | 523/351 |
| 4,480,064 | 10/1984 | Chopra et al. | 523/351 |
| 4,490,323 | 12/1984 | Thomson | 523/351 |
| 4,497,920 | 2/1985 | Thomas et al. | 524/114 |
| 4,499,227 | 2/1985 | Bailey | 523/351 |
| 4,508,859 | 4/1985 | Muhle et al | 523/351 |
| 4,510,271 | 4/1985 | Muhle et al. | 523/351 |
| 4,556,603 | 12/1985 | Thorsrud | 523/351 |
| 4,600,736 | 7/1986 | Needham | 523/351 |
| 4,650,747 | 3/1987 | Uno et al. | 523/351 |
| 4,656,206 | 4/1987 | Carter | 523/351 |
| 5,075,359 | 12/1991 | Castagna et al. | 524/13 |

FOREIGN PATENT DOCUMENTS

| | | | |
|---|---|---|---|
| 0649800 | 10/1962 | Canada | 523/351 |
| 1113220 | 12/1981 | Canada | 523/351 |
| 1226782 | 10/1966 | Germany | 523/351 |
| 2509571 | 9/1975 | Germany | 523/351 |
| 2546118 | 4/1977 | Germany | 523/351 |
| 2703810 | 8/1978 | Germany | 523/351 |
| 3405185 | 8/1985 | Germany | 523/351 |
| 0005201 | 3/1965 | Japan | 523/351 |
| 0013852 | 4/1972 | Japan | 523/351 |
| 0048889 | 12/1972 | Japan | 523/351 |
| 0019640 | 3/1973 | Japan | 523/351 |
| 0011810 | 4/1973 | Japan | 523/351 |
| 0050460 | 5/1975 | Japan | 523/351 |
| 0030851 | 3/1976 | Japan | 523/351 |
| 0046355 | 4/1976 | Japan | 523/320 |
| 0051447 | 4/1977 | Japan | 523/351 |
| 0020055 | 2/1981 | Japan | 523/351 |
| 0179659 | 10/1984 | Japan | 524/318 |
| 0011554 | 1/1985 | Japan | 524/318 |
| 7500806 | 8/1975 | Netherlands | 523/351 |
| 0658153 | 4/1979 | U.S.S.R. | 524/318 |
| 0863732 | 3/1961 | United Kingdom | 523/351 |
| 0888996 | 2/1962 | United Kingdom | 523/351 |
| 1196816 | 7/1970 | United Kingdom | 523/351 |

*Primary Examiner*—Romulo H. Delmendo
*Attorney, Agent, or Firm*—Cushman Darby & Cushman

[57] ABSTRACT

A polymer concentrate contains 15–80% by weight of a liquid, pasty or waxy additive, 5–50% by weight of a particulate solid and at least 5% by weight of a polymer. The particulate solid is finely divided and typically has a particle size in the micrometer range. The concentrate is prepared by adding the additive to the particulate solid while mixing using a solids mixing device, adding the polymer while continuing to mix, preferably at the same speed, subjecting the mixture to an elevated temperature to melt the polymer, cooling and grinding the cooled mixture.

7 Claims, No Drawings

PROCESS FOR PREPARING A POLYMER CONCENTRATE

This is a continuation of application No. 07/863,371, filed on Apr. 3, 1992, which was abandoned upon the filing hereof which is a continuation of Ser. No. 07/745,766, filed Aug. 16, 1991, now abandoned, which is a division of Ser. No. 07/361,721, filed Jun. 5, 1989, now U.S. Pat. No. 5,053,444, which is a continuation of Ser. No. 07/082,577, filed Aug. 7, 1987, now abandoned.

The present invention relates to a polymer concentrate containing a high level of additives and to a method for the incorporation of additives in polymers.

The incorporation of additives in polymers is well-known and there is extensive use of additives in present polymer technology. Additives which are used include antifog agents, antistatic agents, antioxidants, plasticisers, UV stabilisers, non-ionic surfactants and the like.

Some additives may be added during the polymerisation process but this may lead to substantial drawbacks for example in the efficiency of the polymerisation process, by interaction with the polymerisation catalyst, incompatibility with other additives used in the polymerisation process and restriction in subsequent treatment.

A flexible method of incorporating the additives is to blend them with a thermoplastic polymer. For this purpose there is often used a pre-blend of the additive and the polymer which contains a high level of the additive and which can, therefore, serve as a masterbatch or concentrate. The use of a masterbatch or concentrate is a generally preferred technique, particularly with liquid or paste additives the use of which gives rise to dosing problems requiring special metering pumps which my need to be heated if the additive is a viscous substance.

In general masterbatches have been obtained with a maximum loading of 10 to 15% by weight of additive in the materbatch, the maximum achievable loading depending on the nature of the additives incorporated and, especially, their slipping properties and also, due to differences in the absorption, on the kind of polymer to be treated. However, it has been found difficult to obtain a concentrate having a high concentration of additives, that is greater than about 15% by weight of additives.

According to the present invention there is provided a polymer concentrate which contains 15 to 80% by weight of at least one additive which is a liquid, or a pasty, waxy and/or lubricating solid, 5 to 50% by weight of a particulate solid and at least 5% by weight of a polymer.

The concentrate typically contains at least 20% by weight of the additive or mixture of additives, preferably at least 40%, and especially at least 50%, by weight of the additive. The concentrate in general will contain not more than 70% by weight of the additive. A particularly preferred concentrate is one containing 50 to 70% by weight of the additive or mixture of additives.

The concentrate typically contains at least 10% by weight of the polymer. In general the amount of polymer in the concentrate does not exceed 70% by weight and particularly does not exceed 50% by weight. Especially preferred concentrates are those in which the amount of polymer is not more than 40% by weight, for example concentrates containing at least 10% and not more than 40% by weight of polymer.

The amount of the particulate solid will typically be at least 10% by weight of the concentrate. It is generally preferred that the concentrate contains not more than 40% by weight of the particulate solid, especially not more than 30% by weight of the particulate solid. Particularly preferred concentrates contain at least 10%, and not more than 20%, by weight of the particulate solid.

A particularly preferred concentrate in accordance with the present invention contains 50 to 70% by weight of the additive or additive mixture, 10 to 40% by weight of the polymer and 10 to 20% by weight of the particulate solid, the total of additive, polymer, and particulate solid being 100% by weight.

The additives that can be present in the concentrate according to the invention are very diversified and include liquids, paste or waxy low-melting solids or lubricating materials, these additives being of the type which can be used as antifog agents, clarifying agents, antioxidants, U.V. stabilisers, infra-red absorbers, biocides, antistatic agents, plasticisers, flame retardants or for any other purpose in which the use of solid additive is difficult or impossible. Specific additives which may be present in the concentrate include polyalkylene glycols, ethoxylated fatty acids, for example the naturally occurring fatty acids such as coconut fatty acid, ethoxylated amines, for example, the synthetic higher alkyl primary amines, esters such as sorbitan monolaurate and glycerol esters, chlorinated paraffin, organic phosphates, organic phosphites such as trinonylphenylphosphite, and U.V. stabilisers such as benzophenone, benzotriazole or hindered amine light stabilisers. Preferred additives include polyethoxylated amines such as diethoxylated synthetic amines, a convenient amine of this type being a mixture containing alkyl groups having from 13 to 15 carbon atoms, such amines being used alone or in combination with glycerol fatty acid ester such as glycerol monostearate or monooleate, polyoxylated alcohols, polyethylene glycol and sulphates of alcohols containing a mixture of alkyl groups having from 13 to 15 carbon atoms. A mixture of additives may advantageously be used, for example a mixture of polyethoxylated amine with a glycerol fatty acid ester.

Polymers that may be present in the concentrate in accordance with the present invention are thermoplastic polymers which include, but are not restricted to, polystyrene, high impact polystyrene, a styrene-acrylonitrile copolymer, acrylonitrile-butadiene-styrene copolymers, polymethylmethacrylate, linear low-, low- and high-density polyethylene, vinyl chloride polymers and copolymers, and propylene polymers and copolymers.

The particulate solid is typically an inorganic solid which remains solid at temperatures in excess of those used to process the polymer component of the masterbatch. The particulate solid may be a material which is known as a filler for polymers and suitable materials include calcium carbonate; silicates, for example naturally occurring silicates such as talc; and oxides such as magnesium oxide, aluminium oxide and, especially, silica. The particulate solid is used in a form which is such that the solid has a high absorbance capacity for the additive. Thus, the particulate solid is preferably a finely divided material and typically at least 80% of the particles of the solid have a particle size of not more than 50 micrometers. Preferred particulate solids are those at least 80% of the particles of which have a particle size of not more than 20 micrometers, particularly not more than 10 micrometers. Especially preferred particulate solids have a weight average particle size of not more than 10 micrometers. The particulate solid, in addition to being a finely divided material is porous. Furthermore, the particulate solid typically has a specific surface area of at least 10 $m^2/g$. Useful results have been obtained using particulate solids having a specific surface area of at least 50 $m^2/g$ and especially at least 100 $m^2/g$. It is especially preferred that the particulate solid is silica.

A wide range of silicas which are commercially available are useful as the particulate solid in the concentrate of the present invention. Preferably a hydrophobic grade of silica with a weight average particle size in the micrometer range is used. Preferably the concentrate contains 10 to 20% by weight of silica. Typical silica grades include commercially available Sipernat 50S, Sipernat 22 and Aerosil 200 (all available from Degussa), Cab-O-Sil TS 720 (Cabot Corp.) and Gasil 644, all of these materials being characterised by good absorptive capacity.

The concentrate can be incorporated into a polymer to give a masterbatch composition or to give a desired final composition. The concentrate can be incorporated into a polymer using known compounding machines for polymeric materials such as, for example, a Banbury mixer or, particularly, an extruder. The concentrate and the polymeric material may be added to the compounding machine separately at rates to give the desired level of additive in the masterbatch or final compounded polymer which is to be produced.

The concentrate of the present invention is a compounded polymer concentrate in the form of free flowing granules having a high content of liquid paste or waxy additive. The granules of the concentrate are typically non-bridging and have a regular flow rate.

The production of the concentrate is a further feature of the present invention.

Thus, according to a further aspect of the present invention there is provided a process which comprises (A) mixing together at least one liquid, paste or waxy additive and a particulate solid using a solids mixing device;
(B) adding to the mixture a powdered polymer and continuing to mix to obtain an essentially homogeneous mixture;
(C) subjecting the mixture to intensive mixing for a time sufficient to cause melting of the polymer; and
(D) cooling and sub-dividing the resulting mixture.

The mixing in steps (A) and (B) is very conveniently effected using the same apparatus. Any solids mixing device may be used. The mixing may be effected at a slow speed, for example at 30 to 60 r.p.m., for example using a Hobart mixer. Alternatively, mixing can be effected at a high speed, typically in excess of 500 r.p.m., for example 1500 r.p.m., using a high speed mixer such as a Henschel mixer or an Ital high speed mixer.

In step (A), the additive, or mixture of additives, is added to the particulate solid at a rate such that a free flowing powder mixture is obtained. The rate of addition of the additive or additive mixture is dependent on the speed of mixing, the type, and proportion, of additive or additive mixture, the nature of the particulate solid and the quantity of materials which are being mixed together. In general, if mixing is effected at a speed of 30 to 60 r.p.m., effective mixing of the additive, or additive mixture, and the particulate solid can be attained in a time of 30 seconds using up to about 100 g of materials. If mixing is effected at a speed in excess of 500 r.p.m., a mixing time of not more than two minutes is generally sufficient and, at higher speeds, shorter times of not more than one minute, for example as little as 20 seconds may be used. However, it will be appreciated that the time of mixing is dependent, at least to some extent, on the total quantity of materials being mixed together, larger quantities requiring longer times to achieve effective mixing.

In step (B) a powdered polymer is added to the premixed additive, or additive mixture, and particulate solid. The powdered polymer is conveniently added under the same agitation condition as used for step (A). Typically, using the same agitation conditions in step (A) and step (B), the time of addition of the polymer, and/or total agitation time to obtain an essentially homogeneous mixture, is not more than the time required to achieve effective mixing in step (A). In general the time of mixing in step (B) is substantially less than the time of mixing in step (A), for example 75% of the time of step (A) or even 60%, or less, of the time of step (A).

It will be appreciated that steps (A) and (B) can be effected in a continuous manner by adding the various components, in succession, to an appropriate solids mixing device.

Steps (C) and (D) are also conveniently effected in a continuous manner, for example by the use of an extruder feeding a granulating device or an intensive mixer such as a Banbury mixer which produces a sheet which is passed to a cutting device to form granules. The intensive mixing may be effected with heating but it will be appreciated that many intensive mixing procedures generate substantial heat and it may be necessary to apply only a small amount of heating.

The temperature attained during step (C) should be sufficient to effect melting of the polymer. The additive, or mixture of additives, used should be stable at the temperature of step (C), at least for the period for which this temperature is maintained, and also the temperature of any subsequent stage in which the mixture is subjected to an elevated temperature, for example when forming the final polymer composition. The temperature of step (C) will be dependent upon the particular polymer used and for many polymers will be at least about 150° C. and may be 200° C. or even higher.

Step (C) is effected for a relatively short time which is dependent to some extent on the total amount of mixture being processed and the nature of the polymer being used and may be as little as 20 seconds up to several, for example ten, minutes.

In step (D), the mixture is allowed to cool to allow at least a partial solidification of the polymer. Conveniently, using an extruder, the masterbatch mixture is withdrawn from the extruder die as one or more laces which are passed into a water bath and the cooled laces are thereafter granulated. Procedures for melting and granulating polymer mixtures are well known and any suitable procedure may be used to effect stages (C) and (D).

In step (A), the weight of the additive, or additive mixture, is preferably at least equal to the weight of the particulate solid. It is especially preferred that the weight of the additive, or additive mixture, is greater than the weight of the particulate solid, for example from 2:1 by weight up to 10:1 by weight, typically about 3:1 by weight.

The polymer which is used in step (B) must be in the form of a powder, that is a material with average particle dimensions less than one mm. Granules, pellets or diced polymer, all of which are typically obtained by melting a polymer and then sub-dividing the polymer after it has at least partially re-solidified, generally are not appropriate for the purpose of the invention. Since such materials have a particle size which is generally too large to be useful in the process of the present invention. Some polymers such as low density polyethylene obtained at high pressure using a free radical initiator are obtained as granules from which powder can be obtained by grinding the granules.

Preferred powdered polymers are thermoplastic polymers such as propylene polymers including random propylene copolymers, sequential or so-called block propylene copolymers, propylene homopolymers, polyethylene including linear low density polyethylene, polystyrene or polyvinyl chloride.

The polymer used in step (B) is very preferably of the same type as the polymer with which the concentrate is to be blended. However, the polymers need not be the same provided that, in the blend of the polymer and concentrate, two distinct polymer phases do not result.

Further aspects of the present invention are now described, by way of example only, in the following non-limiting examples.

EXAMPLE 1

Silica (Sipernat 50S, available from Degussa and having an average particle size of about 8 micrometers as determined using a Coulter counter with a 100 micrometer capillary) was stirred at 60 r.p.m. using a Hobart mixer. To the stirred silica was added a mixture of alkyl diethanolamines in which the alkyl groups contain from 13 to 15 carbon atoms. ('Atmer' 163 available from Imperial Chemical Industries PLC, 'Atmer' is a Registered Trade Mark). The 'Atmer' 163 was added to the silica in a weight ratio 'Atmer' 163:silica of 4.7:1 over a period of two minutes whilst continuing to stir at 60 r.p.m.

A propylene sequential copolymer powder containing about 6.5% by weight of ethylene ('Propathene' grade GY621M, available from Imperial Chemical Industries PLC, 'Propathene' is a Registered Trade Mark) was then added to the mixture over a period of one minute whilst continuing to stir at 60 r.p.m. The copolymer was added to the mixture to give a composition of 70% by weight of the alkyl diethanolamine mixture, 15% by weight of silica and 15% by weight of the copolymer.

The mixture was then melted using a Polymix 150 type two roll mill (available from Schwabenthan) with the front roll at 210° C. and the rear roll at 160° C. The molten polymer was granulated using a Pallmann type PS/2 granulator.

EXAMPLE 2

The product of Example 1 was incorporated into a further sample of the propylene sequential copolymer powder ('Propathene' grade GY621M) to give a polymer product containing 0.9% by weight of the alkyl diethanolamine mixture ('Atmer' 163). Incorporation was effected using a two-roll friction mill with the front roll at 210° C. and the rear roll at 160° C. for a time of two minutes.

The mixture obtained was compression moulded to form sheets of thickness 2 mm by pressing at 160° C. and 100 bar for 30 seconds, raising the pressure to 300 bar, pressing at 160° C. and 300 bar for 30 seconds, cooling to 90° C. over a period of 30 seconds whilst maintaining an applied pressure of 300 bar and then ejecting the moulded sheet.

The surface resistivity of the sheet was measured by the procedure of ASTM Test Method D257-61 using a Keithly Resistivity Measuring System consisting of a power supply, a resistivity chamber and an electrometer.

Before effecting the measurement, the samples were stored for at least 24 hours at 50% relative humidity and 20° C. and the surface resistivity was also measured at 50% relative humidity and 20° C. A voltage of 500 volts was applied across the surface of the sample for one minute and the resulting current was measured from which the surface resistivity (in ohms) could be calculated. Repeat measurements were made, on the same sample, over a period of one month.

For the purposes of comparison, similar measurements were made on a sample obtained by incorporating the pure alkyl diethanolamine mixture into the polymer, the procedure otherwise being as described herein.

The surface resistivity results are given in Table 1.

TABLE 1

| Example or | Log surface resistivity after (b) | | | |
|---|---|---|---|---|
| Comp. Ex. (a) | 1 day | 1 week | 2 weeks | 1 month |
| 2 | 12.2 | 11.2 | 10.6 | 9.8 |
| A | 12.4 | 11.1 | 10.5 | 9.7 |

Notes to Table 1
(a) 2 is a sheet obtained in accordance with Example 2.
A is a sheet obtained by mixing the additive (the alkyl diethanolamine mixture) directly into the polymer.
(b) The time is measured from the production of the sheet.

EXAMPLE 3

A concentrate was produced by the procedure of Example 1 but using, as the additive, glycerol monostearate ('Atmer' 129, available from Imperial Chemical Industries PLC) and the alkyl diethanolamine mixture in a weight ratio of 2:1 to give an additive content of 70% by weight.

EXAMPLE 4

The procedure of Example 2 was repeated using the product of Example 3 to obtain a polymer product containing 0.9% by weight of the additive mixture.

By way of comparison, the surface resistivity was also measured using a polymer product to which the additives had been directly added.

The surface resistivity results are given in Table 2.

TABLE 2

| Example or | Log surface resistivity after (b) | | | |
|---|---|---|---|---|
| Comp. Ex. (c) | 1 day | 1 week | 2 weeks | 1 month |
| 4 | 12.5 | 11.5 | 10.9 | 10.2 |
| B | 12.2 | 11.6 | 11.0 | 10.2 |

Notes to Table 2
(b) is as defined in Notes to Table 1.
(c) 4 is a sheet obtained in accordance with Example 4.
B is a sheet obtained by adding the mixture of additives directly to the polymer.

EXAMPLE 5

The procedure of Example 1 was repeated to obtain a concentrate containing 50% by weight of glycerol monostearate, 20% by weight of silica and 30% by weight of a propylene homopolymer ('Propathene' GW 522M, available from Imperial Chemical Industries PLC).

EXAMPLE 6

The procedure of Example 1 was repeated using the concentrate of Example 5, and a quantity of a propylene homopolymer ('Propathene' GYM 45, available from Imperial Chemical Industries PLC) to obtain a polymer product containing 1% by weight of glycerol monostearate.

By way of comparison, the surface resistivity was also measured using a polymer containing no glycerol monostearate and using a polymer product to which the additive had been added directly.

The surface resistivity results are given in Table 3.

TABLE 3

| Example or | Log surface resistivity after (b) | | | |
| --- | --- | --- | --- | --- |
| Comp. Ex. (d) | 1 day | 1 week | 2 weeks | 1 month |
| 6 | 12.1 | 11.8 | 11.6 | 11.6 |
| C | 14.7 | 15.0 | 15.0 | 15.0 |
| D | 11.7 | 11.9 | 11.7 | 11.8 |

Notes to Table 3
(b) is as defined in Notes to Table 1.
(d) 6 is a sheet obtained in accordance with Example 6.
C is a sheet obtained using a polymer with no added glycerol monostearate.
D is a sheet obtained using a polymer to which the glycerol monostearate was added directly.

EXAMPLES 7 TO 11

Concentrates were prepared according to the general procedure of Example 1 but varying one or more of the components and the proportions thereof.

The composition of each concentrate is set out in Table 4.

TABLE 4

| Example | Component (e) | % wt |
| --- | --- | --- |
| 7 | PP-1 | 20 |
|   | ADEA | 60 |
|   | $SiO_2$-1 | 20 |
| 8 | PP-1 | 20 |
|   | SML | 60 |
|   | $SiO_2$-1 | 20 |
| 9 | PP-1 | 20 |
|   | TNPP | 60 |
|   | $SiO_2$-1 | 20 |
| 10 | PVC-1 | 15 |
|    | C | 70 |
|    | $SiO_2$-1 | 15 |
| 11 | PVC-2 | 23 |
|    | ECA | 50 |
|    | $SiO_2$-1 | 13 |
|    | DOP | 14 |

Notes to Table 4
(e) PP-1 is a propylene homoopolymer powder ('Propathene' GW 522M, available from Imperial Chemical Industries PLC).
ADEA is a mixture of alkyl diethanolamines in which the alkyl groups contain from 13 to 15 carbon atoms ('Atmer' 163, available from Imperial Chemical Industries PLC).
$SiO_2$-1 is commercially available hyrophobic silica (Sipernat 50S, available from Degussa).
SML is sorbitan monolaurate ('Atmer' 100, available from Imperial Chemical Industries PLC).
TNPP is trisnonylphenylphosphite (Irgafos tNPP, available from Ciba-Geigy).
PVC-1 is polyvinylchloride ('Corvic' grade PB 1702, available from Imperial Chemical Industries PLC, 'Corvic' is a Registered Trade Mark).
C is a chlorinated paraffin containing 52% by weight of chlorine and having a chain length of 14 to 17 carbon atoms (Cereclor S 52, available from Imperial Chemical Industries PLC).
PVC-2 is polyvinyl chloride (Solvic grade 258 RE, available from Solvay).
ECA is polyethoxylated (9) coconut fatty acid ('Atmer' 154, available from Imperial Chemical Industries PLC).
DOP is dioctyl phthalate.

EXAMPLES 12 TO 14

A further series of concentrates was prepared using the procedure of Example 1 with the following modifications. The solids mixing was effected using an Ital high speed mixer operating at a speed of 1500 r.p.m. Blending of the additives and silica was effected over a period of 20 seconds. The polypropylene powder was added over a period of 10 seconds. The powder mixture was introduced into the hopper of a Comacplast counter rotating twin screw extruder with screws of 75 mm diameter and a temperature profile from the hopper to the die of 180° C., 190° C., 190° C., 170° C., 170° C., 190° C. and 180° C. The polymer lace was passed into a water bath and then granulated using a pelletizer.

The concentrates obtained by this procedure are set out in Table 5.

TABLE 5

| Example | Component (e) (f) | % wt |
| --- | --- | --- |
| 12 | PP-1 | 30 |
|    | ADEA | 50 |
|    | $SiO_2$-1 | 20 |
| 13 | PP-1 | 38 |
|    | GMS | 33 |
|    | ADEA | 17 |
|    | $SiO_2$-1 | 12 |
| 14 | PP-1 | 35 |
|    | GMS | 50 |
|    | $SiO_2$-1 | 15 |

Notes to Table 5
(e) is defined in Notes to Table 4.
(f) GMS is glycerolmonostearate ('Atmer' 129, available from Imperial Chemical Industries PLC).

EXAMPLE 15

The procedure of Example 1 was repeated using finely divided talc (Steamic 00S, available from Luzenac) in place of silica. Several experiments were effected to determine the highest level of additive which could be incorporated to produce a free-flowing granulated concentrate. A maximum of 30% by weight of the alkyl diethanolamine mixture was obtained in a concentrate of composition 30% by weight of alkyl diethanolamine mixture, 40% by weight of talc and 30% by weight of the copolymer.

EXAMPLE 16

The procedure of Example 15 was repeated using finely divided calcium carbonate (Winnofil SPM, available from Imperial Chemical Industries PLC) in place of the talc. A maximum of 20% by weight of the alkyl diethanolamine mixture was obtained in a concentrate of composition 20% by weight of alkyl diethanolamine mixture, 50% by weight of calcium carbonate and 30% by weight of the copolymer.

EXAMPLES 17 TO 34

The procedure of Example 1 was repeated varying one or more of the components and/or the proportions thereof.

The composition of each concentrate obtained is set out in Table 6.

TABLE 6

| Example | Component (e) (f) (h) | % wt |
| --- | --- | --- |
| 17 | PVC-1 | 25 |
|    | ADEA | 60 |
|    | $SiO_2$-1 | 15 |
| 18 | PVC-1 | 20 |
|    | ADEA | 50 |
|    | $SiO_2$-1 | 20 |
|    | DOP | 10 |
| 19 | PP-1 | 20 |
|    | GMO | 65 |
|    | $SiO_2$-1 | 15 |
| 20 | PP-1 | 20 |
|    | HAL-1 | 60 |
|    | $SiO_2$-1 | 20 |
| 21 | PP-1 | 20 |

TABLE 6-continued

| Example | Component (e) (f) (h) | % wt |
|---|---|---|
|  | AO | 60 |
|  | SiO$_2$-1 | 20 |
| 22 | PE-1 | 35 |
|  | SMS | 50 |
|  | SiO$_2$-1 | 15 |
| 23 | PE-1 | 35 |
|  | GMS | 50 |
|  | SiO$_2$-1 | 15 |
| 24 | PE-1 | 35 |
|  | GMS | 50 |
|  | SiO$_2$-2 | 15 |
| 25 | PE-1 | 30 |
|  | GMS | 40 |
|  | ADEA | 10 |
|  | SiO$_2$-1 | 20 |
| 26 | PE-1 | 30 |
|  | GMS | 40 |
|  | ADEA | 10 |
|  | SiO$_2$-2 | 20 |
| 27 | SAN | 30 |
|  | GMS | 25 |
|  | ADEA | 25 |
|  | SiO$_2$-1 | 20 |
| 28 | PS | 35 |
|  | ADEA | 50 |
|  | SiO$_2$-1 | 15 |
| 29 | PE-2 | 30 |
|  | ADEA | 50 |
|  | SiO$_2$-2 | 20 |
| 30 | SAN | 30 |
|  | ADEA | 50 |
|  | SiO$_2$-1 | 20 |
| 31 | PE-1 | 35 |
|  | PGS | 50 |
|  | SiO$_2$-2 | 15 |
| 32 | PS | 35 |
|  | AS | 50 |
|  | SiO$_2$-1 | 15 |
| 33 | PP-2 | 30 |
|  | HAL-2 | 50 |
|  | SiO$_2$-1 | 20 |
| 34 | PP-3 | 30 |
|  | GA | 50 |
|  | PEW | 5 |
|  | SiO$_2$-1 | 15 |

Notes to Table 6
(e) is as defined in Notes to Table 4.
(f) is as defined in Notes to table 5.
(h) GMO is glycerolmono-oleate ('Atmer' 1007, available from Imperial Chemical Industries PLC).
HAL-1 is a hindered amine light stabiliser (Mark LA-62, available from Adeka Argus).
AO is an antioxidant (bis[2-methyl-4-(3-n-alkylthiopropionyl-oxy)-5-t-butylphenyl]sulphide in which the alkyl group contains 12 to 14 carbona toms and available as Mark AO-23 from Adeka Argus).
SMS is sorbitan monostearate ('Atmer' 103, available from Imperial Chemical Industreis PLC).
PE-1 is a low density polyethylene powder (Escorene MP 653-20, available from Essochem).
SiO$_2$-2 is commercially available hydrophobic silica (FK 310, available from Degussa and having an average particle size of about 4 micrometers as determined using a Coutler counter with a 50 micrometer capillary).
SAN is a styrene-acrylonitrile copolymer (Lustran QE 357, available from Monsanto).
PS is polystyrene (Gedex 1819 JA-100, available from CDF-Chimie).
PE-2 is a linear low density polyethylene of density 0.935 g/cm$^3$ (Escorene LL 6301-RQ, available from Essochem).
PGS is polyglycerolstearate which is a mixture of mono- and di-stearate and contains an average of four glycerol units ('Atmer' 184, available from Imperial Chemical Industries PLC).
AS is an alkyl sulphonate in which the alkyl group is a mixture containing from 12 to 16 carbon atoms ('Atmer' 190, available from Imperial Chemical Industries PLC).
HAL-2 is a hindered amine light stabiliser (described as poly[(6-[(1,1,3,3-tetramethylbutyl)imino]-1,3,5-triazine-2,4-diyl(2-[2,2,6,6-tetramethylpiperidyl]imino)-hexamethyl-4-[2,2,6,6-tetramethylpiperidyl]imino)] and available as Chimassorb 944 LD, from Ciba-Geigy).
PP-2 is a propylene homopolymer ('Propathene' GX 543M, available from Imperial Chemical Industries PLC).
PP-3 is a random propylene copolymer containing about 3% by weight of ethylene ('Propathene PXC 22265, available from Imperial Chemical Industries PLC).
GA is glutaric acid.
PEW is polyethylene wax having a Brookfield viscosity at 150° C. of 8500 cps (AC 316A, available from Allied Chemicals).

I claim:

1. A process for preparing a polymer concentrate which comprises:

(A) mixing together (i) at least one additive selected from the group consisting of a liquid, a paste and a waxy low melting solid, and (ii) a particulate inorganic solid which remains solid at temperatures in excess of those used to process the polymer component of the polymer concentrate in said process using a solids mixing device, said additive being added to said inorganic particulate solid at a rate such that a free-flowing powder is obtained and being selected from an anti-fog agent, a clarifying agent, an antioxidant, a U.V. stabilizer, an infra-red absorber, a biocide, an antistatic agent, a plasticizer or a flame retardant;

(B) adding to the resulting free-flowing powder mixture a powdered thermoplastic polymer and continuing to mix to obtain a homogeneous mixture, said polymer being selected from polystyrene, high impact polystyrene, a styrene-acrylonitrile copolymer, an acrylonitrile-butadiene-styrene copolymer, an ethylene polymer or copolymer, a vinyl chloride polymer or copolymer or a propylene polymer or copolymer;

(C) subjecting the mixture to intensive mixing for a time sufficient to melt the polymer; and (D) cooling and granulating the resulting mixture so as to obtain a polymer concentrate which contains, on the basis of the weight of concentrate, from 40–80% of said additive, from 5–20% by weight of the particulate solid and at least 5% by weight of the thermoplastic polymer.

2. The process of claim 1 wherein steps (A) and (B) are effected using the same apparatus.

3. The process of claim 2 wherein steps (A) and (B) are effected by mixing at at least 30 r.p.m.

4. The process of claim 3 wherein mixing is effected at a rate of at least 500 r.p.m.

5. The process of claim 1 wherein step (C) is effected in an extruder.

6. The process of claim 5 wherein in step (C) the mixture is extruded as a lace, which is cooled in a water bath and granulated.

7. The process of claim 1 wherein the inorganic particulate solid is calcium carbonate, a silicate, an oxide or silica and the powdered polymer is an ethylene or propylene polymer.

* * * * *